(12) United States Patent
Minoura et al.

(10) Patent No.: US 10,501,039 B2
(45) Date of Patent: Dec. 10, 2019

(54) WORK VEHICLE HAVING ROPS

(71) Applicant: KUBOTA CORPORATION, Osaka (JP)

(72) Inventors: Akira Minoura, Osaka (JP); Hiroyuki Tada, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 69 days.

(21) Appl. No.: 15/852,670

(22) Filed: Dec. 22, 2017

(65) Prior Publication Data

US 2019/0193661 A1 Jun. 27, 2019

(51) Int. Cl.
| | | |
|---|---|---|
| *B60R 21/13* | (2006.01) | |
| *B60D 1/167* | (2006.01) | |
| *B60R 19/38* | (2006.01) | |
| *B60D 1/00* | (2006.01) | |

(52) U.S. Cl.
CPC ............ *B60R 21/13* (2013.01); *B60D 1/1675* (2013.01); *B60R 19/38* (2013.01); *B60D 2001/001* (2013.01); *B60Y 2200/223* (2013.01)

(58) Field of Classification Search
CPC ................ B60R 21/013; B60R 21/131; B60R 2021/0018
See application file for complete search history.

(56) References Cited

U.S. PATENT DOCUMENTS

| | | | | |
|---|---|---|---|---|
| 3,402,941 | A * | 9/1968 | Martinmaas | B60R 21/131 280/748 |
| 5,129,676 | A * | 7/1992 | Sheehan | B60R 21/131 280/756 |
| 5,503,430 | A * | 4/1996 | Miki | B60R 21/131 280/756 |
| 7,971,904 | B2 * | 7/2011 | David | B60R 21/13 280/756 |
| 8,523,225 | B2 * | 9/2013 | Reinke | B60R 21/13 280/756 |
| 8,777,263 | B2 * | 7/2014 | Biers, Sr. | B60R 11/00 280/756 |
| 8,905,434 | B1 * | 12/2014 | Bartel | B60R 21/131 280/756 |
| 9,511,735 | B2 * | 12/2016 | Schlup, Jr. | B60R 21/131 |
| 9,616,837 | B1 * | 4/2017 | Bartel | B60R 21/131 |
| 2016/0057924 | A1 * | 3/2016 | Asahara | B60K 1/00 180/6.5 |
| 2018/0037183 | A1 * | 2/2018 | Bartel | B60R 22/48 |

* cited by examiner

*Primary Examiner* — Faye M Fleming
(74) *Attorney, Agent, or Firm* — Greenblum & Bernstein, P.L.C.

(57) ABSTRACT

A work vehicle includes a front wheel unit and a rear wheel unit attached to a vehicle body frame, a power source mounted at a rear portion of the vehicle body frame, a ROPS bracket fixed to the vehicle body frame at a region thereof forwardly of the power source and a ROPS. this ROPS includes a pair of left and right upright portions and a crossbar connecting the upright portions at upper portions thereof. Lower end portions of the pair of upright portions are supported to the ROPS bracket to be pivotable toward the power source about a horizontal axis extending in a vehicle-body transverse direction.

15 Claims, 5 Drawing Sheets

WORK VEHICLE HAVING ROPS

TECHNICAL FIELD

This invention relates to a work vehicle having a ROPS (Rollover Protection Structure) including a pair of left and right upright portions and a crossbar that connects the upright portions at upper portions thereof.

BACKGROUND ART

A ROPS for a work vehicle according to U.S. Pat. No. 5,503,430 includes a pair of left and right lower posts extending in a curve from vicinity of a transmission and a portal-shaped upper crossbar. Base end portions of the lower posts are fixed to a vehicle body. Left and right lower end portions of the upper crossbar are pivotally connected to upper end portions of the respective lower posts to be pivotable about a horizontal axis and connected and fastened thereto with connecting bolts. At connecting portions of the lower post and the upper crossbar, there are provided an engaging portion and an engaged portion which are opposed to and engaged with each other. Under a free state releasing the bolt fastening between the lower post and the upper crossbar, the engaging portion and the engaged portion are resiliently separated from each other in an engagement releasing direction. With this, the upper crossbar is rendered freely pivotable. By being fixed to a desired position by the bolt fastening, the height of the ROPS is adjusted.

With the above-described ROPS, as the lower posts are long rods having complicated curved shape, the ROPS requires not only high production cost, but also high rigidness and attaching strength. Moreover, even when the ROPS is adjusted to the lowest possible height position, the height of the lower posts fixed to the vehicle body remains the same and the positions of the pivotal connection between the lower posts and the upper crossbar remain higher than the driver's seat. For this reason, with whatever adjustment of the positon of the ROPS, the lower posts will present obstacle in driver's getting on/off the vehicle and maintenance work.

A ROPS for a work vehicle according to U.S. Pat. No. 7,971,904 includes a pair of left and right leg portions, a portal-shaped crossbar and a pivotal bracket for pivotally connecting lower ends of a crossbar to upper ends of the lower leg portions. The lower leg portions have their lower ends fixed to a vehicle body frame and extend in a curve from the horizontal to an upper side, thus striding over an engine therebetween. With this ROPS too, adjustment of the ROPS to the lowest possible height does not change the height of the lower legs fixed to the vehicle body frame and this height remains lower than the driver's seat, but still higher than the engine. For this reason, with whatever posture adjustment of the ROPS, the ROPS will still present obstacle in maintenance work to be done in the vicinity of the engine.

SUMMARY OF THE INVENTION

An object of the present invention is to provide a work vehicle with a simple arrangement, yet with possibility of changing general posture of ROPS.

To accomplish the above object, according to the present invention, a work vehicle comprises: a vehicle body frame extending in a vehicle body front-rear direction; a front wheel unit and a rear wheel unit attached to the vehicle body frame; a driver's seat disposed upwardly of the vehicle body frame; a power source mounted at a rear portion of the vehicle body frame; a ROPS bracket fixed to the vehicle body frame and at a region thereof forwardly of the power source; and a ROPS. This ROPS includes a pair of left and right upright portions and a crossbar connecting the upright portions at upper portions thereof. Lower end portions of the pair of upright portions are supported to the ROPS bracket to be pivotable toward the power source about a horizontal axis extending in a vehicle-body transverse direction.

With the above-described configuration, lower ends of the upright portions which constitute root members of the ROPS are pivotally supported to the ROPS bracket which in turn is fixed to the vehicle body frame. Therefore, according to its pivotal position, the ROPS as a whole is changed in its posture. With this, the ROPS can be easily adjusted to an optimal posture according to a particular situation of the work vehicle.

For instance, according to a preferred embodiment of the invention, the upright portions may be locked at a plurality of pivotal positions, each of which position provides a special function. For example, such preferred pivotal positions of the upright portions include a ROPS position at which the upright portions provide ROPS function, a power-source guard position at which the upright portions and the crossbar assume a horizontal posture to surround the power source, and a towing position at which the upright portions and the crossbar assume a downwardly inclined posture beyond the horizontal posture to allow the ROPS to serve as a tow hitch.

DETAILED DESCRIPTION

Next, a grass mower as an example of a work vehicle having a ROPS relating to the present invention will be explained with reference to the accompanying drawings. In this detailed description, unless indicated explicitly otherwise, "front" means the front (or forward) side in a vehicle body front-rear direction (traveling direction), and "rear" means the rear (or back/reverse) side with respect to the vehicle body front-rear direction (traveling direction). Further, "left/right" or "lateral" means a vehicle body transverse direction (vehicle body width direction) perpendicular to the vehicle body front-rear direction. Also, "upper" or "lower" designates a positional relationship with respect to the perpendicular (or vertical) direction of the vehicle body, referring to relationship in the respect of ground-clearance height.

Figure 1:
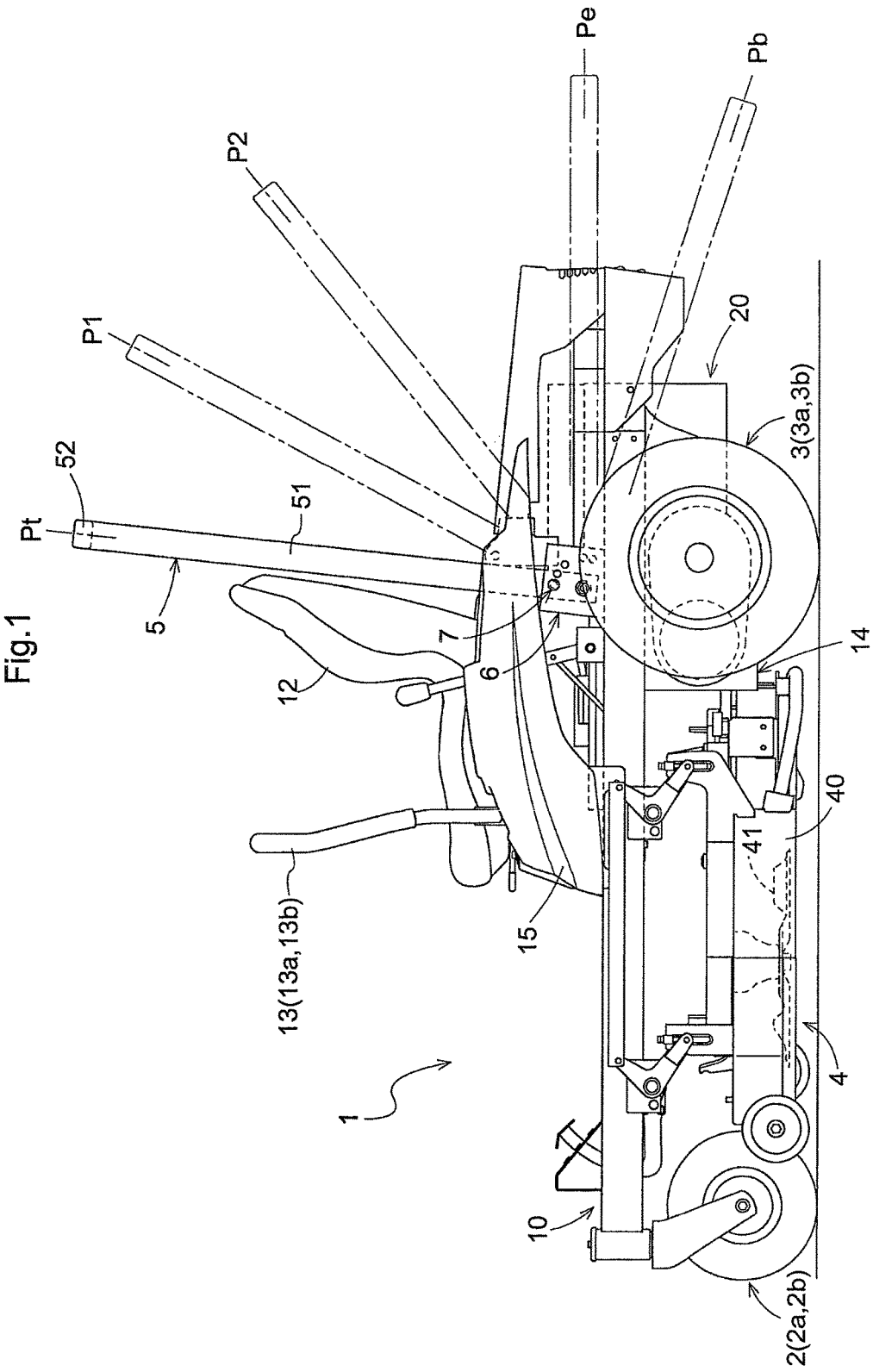
FIG. 1 is a side view of a grass mower as an example of a work vehicle having a ROPS.
Figure 2:
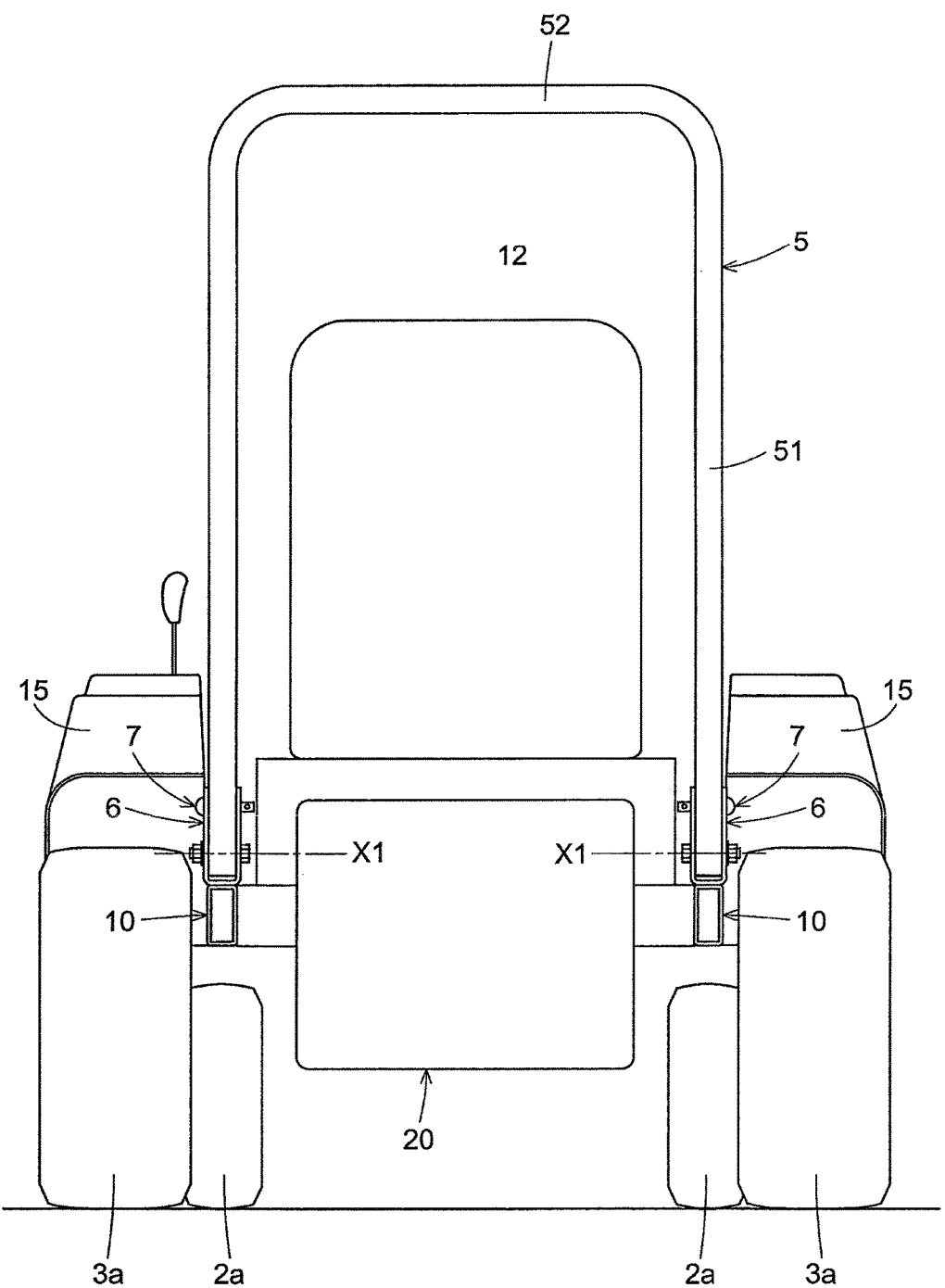
FIG. 2 is a front view of the ROPS.

FIG. 1 is a side view of a grass mower. FIG. 2 is a schematic front view of the grass mower. This grass mower includes a vehicle body frame 1 supported on a ground surface with a caster type front wheel unit 2 and a drive type rear wheel unit 3. This grass mower is configured as a so-called zero-turn mower, meaning that a left rear wheel 3a and a right rear wheel 3b together constituting the rear wheel unit 3 allow their traveling speed and direction control independently of each other. The front wheel unit 2 includes a left front wheel 2a and a right front wheel 2b. The principal constituent of the vehicle body 1 is a vehicle body frame 10 comprising plate members, angular tube members or combinations thereof. Between the front wheel unit 2 and the rear wheel unit 3, a mower unit 4 is disposed under the vehicle body frame 10.

The vehicle body frame 10 extends in the vehicle body front-rear direction. At a center portion of the vehicle body frame 10, a driver's seat 12 is provided. On top of a front portion of the vehicle body frame 10, there is mounted a floor plate, which is used as a footrest for a driver.

At a rear portion of the vehicle body frame 10, a power source 20 is disposed. This power source 20 can be a mechanical power source (a gasoline engine or a diesel engine) or an electric power source (combination of a battery and an electric motor) or can be a hybrid drive power source using both such mechanical and electrical power sources in combination.

On left and right opposed sides of the driver's seat 12, fenders 15 are provided. On upper faces of the fenders 15, various user control devices such as various operational levers, operational buttons, etc. are disposed.

A control unit 13 as one of such user control devices includes a left control lever 13a disposed on the left side of the driver's seat 12 and a right control lever 13b disposed on the right side of the driver's seat 12. The left control lever 13a is used for adjusting a rotational speed of the left rear wheel 3a and the right control lever 13b is used for adjusting a rotational speed of the right rear wheel 3b. The left control lever 13a and the right control lever 13b respectively are pivotally displaceable to/from a forward traveling speed changing region, a neutral, and a reverse traveling speed changing region.

A pair of left and right raveling transmission mechanisms 14 are provided for speed-changing power from the power source 20 and transmitting resultant speed-changed power to the left rear wheel 3a and the right rear wheel 3b. According to a user's operation on the left control lever 13a and the right control lever 13b, the vehicle body 1 will be rendered into one of a stop state, a forward traveling state, a gentle turning state, a pivot turning state and a spin turning state. The stop state provides that the left rear wheel 3a and the right rear wheel 3b are stopped. The forward traveling state provides that the left rear wheel 3a and the right rear wheel 3b are driven at an equal speed forwardly or reversely. The gentle turning state provides that the left rear wheel 3a and the right rear wheel 3b are driven forwardly or reversely at speeds different from each other. The pivot turning state provides that one of the left rear wheel 3a and the right rear wheel 3b is stopped while the other is driven forwardly or reversely. The spin turning state provides that one of the left rear wheel 3a and the right rear wheel 3b is driven forwardly while and the other is driven reversely.

Rearwardly of the driver's seat 12, an arch-shaped ROPS 5 is mounted vertically. This ROPS 5, as shown in FIG. 1 and FIG. 2, includes a pair of left and right upright portions 51, and a crossbar 52 that connects the upright portions 51 to each other at their upper portions. The left and right upright portions 51 and the crossbar 52 together form a portal-shaped structure. If needed, the pair of left and right upright portions 51 and the crossbar 52 may be formed integral with each other or can be provided as a separate structure consisting of separate members connected to each other. In the instant embodiment, the upright portions 51 and the crossbar 52 respectively comprise substantially linear members, curved only at their mutually connecting areas. However, the ROPS of the present invention is not limited to such shape or configuration.

Though shown only schematically in FIG. 2, a lower end portion of the respective upright portion 51 is supported to an associated ROPS bracket 6 to be pivotable toward the power source 20 about a horizontal axis X1 extending along a vehicle body transverse direction. The ROPS bracket 6 is fixed to the vehicle body frame 10 at a region thereof forwardly of the power source 20. In the instant embodiment, as shown in FIG. 1, each upright portion 51 is pivotable between an upper pivotal position (denoted with a mark Pt in FIG. 1) where it assumes a substantially upright posture and a lower pivotal position (denoted with a mark Pb in FIG. 1) where it assumes a downwardly oriented posture downwardly pivoted beyond a horizontal posture. The upright posture of the upright portions 51 provides a ROPS posture where the ROPS 5 can effectively provide its original function. Whereas, the lower pivotal posture provides a towing posture where the ROPS 5 is caused to function as a tow hitch.

FIG. 1 shows a horizontal pivotal position between the upper pivotal position and the lower pivotal position. At this horizontal pivotal position, the respective upright portion 51 and the crossbar 52 assume a horizontal posture to surround the power source 20, thus providing a power source guarding posture for guarding the power source 20. Further, between the upper pivotal position and the horizontal pivotal position, there are provided a first intermediate pivotal position (denoted with a mark P1 in FIG. 1) and a second intermediate pivotal position (denoted with a mark P2 in FIG. 1). At each one of these pivotal positions selectively, the upright portion 51 can be locked by a lock mechanism 7.

Figure 3:
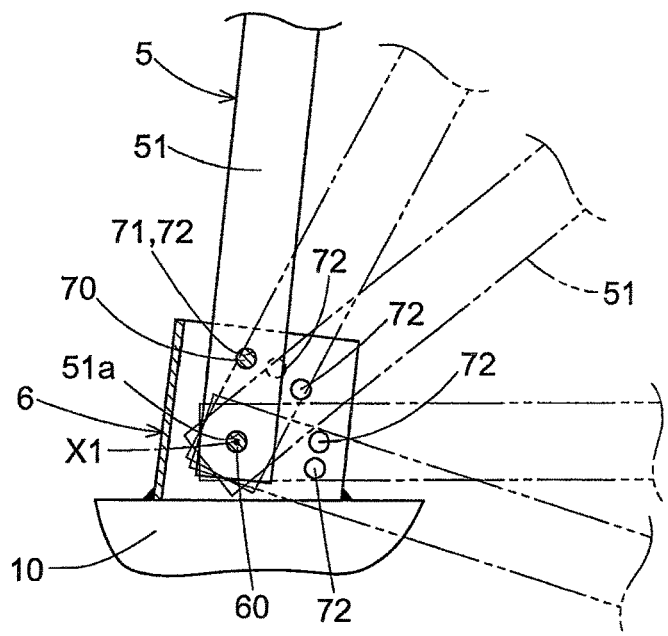
FIG. 3 is a side view showing a lower leg portion of the ROPS and a ROPS bracket.

FIG. 3 shows relationship among the lock mechanism 7, the ROPS bracket 6 and the upright portions 51. The ROPS bracket 6 comprises a box-shaped or an angle-shaped base, to whose side face a pivot pin 60 having the pivot axis X1 is attached. At a lower end of the upright portion 51, there is provided a pin receiver 51a for receiving the pivot pin 60. The pin receiver 51a can be formed as a pin hole in which the pivot pin 60 is to be inserted.

The lock mechanism 7 consists essentially of the pivot pin 6, a reference lock hole 71 and selection lock holes 72 extending parallel with each other and a lock pin 70 which is to be inserted into these reference lock hole 71 and selection lock hole 72. The selection lock holes 72 are formed at locations corresponding the pivotal positions of the upright portion 51 and by the number of these pivotal positions. Namely, when the lock pin 70 is inserted into the reference lock hole 71 and a predetermined selection lock hole 72, the upright portion 51 will be locked at the predetermined pivotal position.

Figure 4:
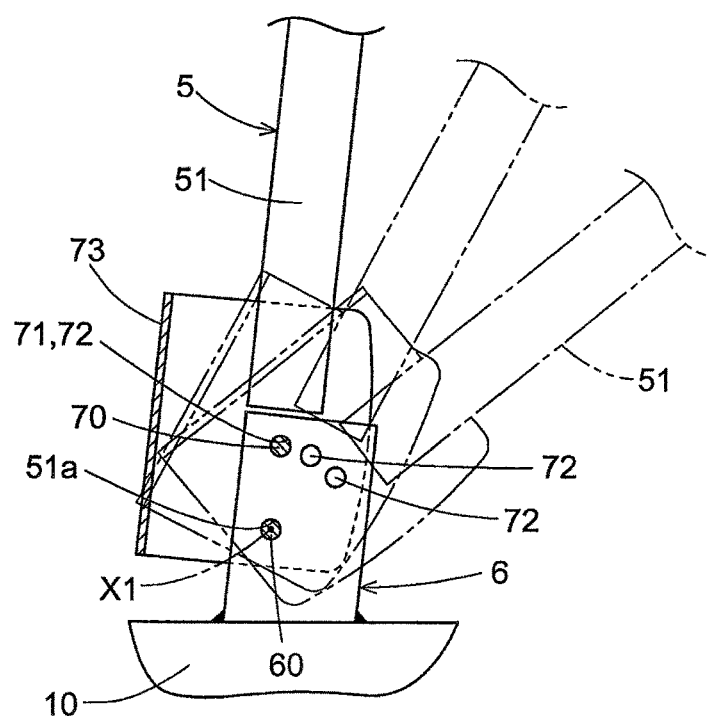
FIG. 4 is a side view showing showing a lower leg portion of the ROPS and a ROPS bracket according to a first modified embodiment.

In FIG. 3, the reference lock hole 71 is formed in the upright portion 51. Alternatively, as shown in FIG. 4, such reference lock hole 71 may be formed in a lock assist plate 73 which is attached to the upright portion 51. In the example shown in FIG. 4, the number of the selection lock holes 72 is reduced to three.

Figure 5:
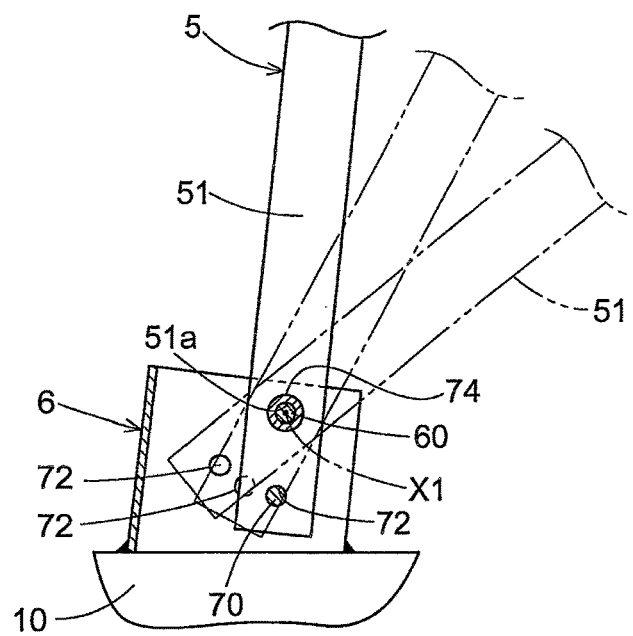
FIG. 5 is a side view showing showing a lower leg portion of a ROPS and a ROPS bracket according to a second modified embodiment.
Figure 6:
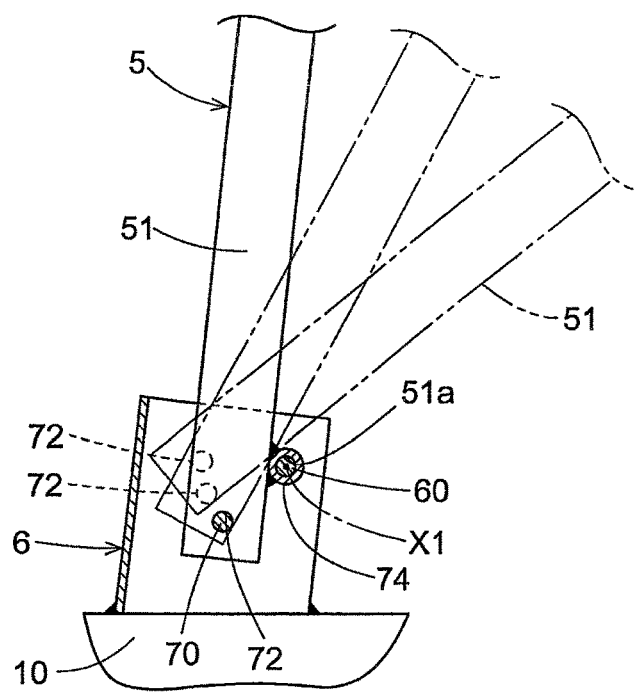
FIG. 6 is a side view showing showing a lower leg portion of a ROPS and a ROPS bracket according to a third modified embodiment.

In the example shown in FIG. 3 and FIG. 4, there is employed a layout in which when the upright portion 51 is located at the upper pivotal position, the selection lock holes 72 are located upwardly of the pivot axis X1. Instead of this, in the case of an example shown in FIG. 5 and FIG. 6, there is employed a layout in which the selection lock holes 72 are disposed downwardly of the pivot axis X1. Further, in the example shown in FIG. 5 and FIG. 6, the pin receiver 51a for receiving the pivot pin 60 is formed by a boss hole of a boss member 74 fixed to the upright portion 51. In the example shown in FIG. 6, the boss member 74 is fixed to a lateral face of the upright portion 51. In FIG. 5 and FIG. 6 also, the number of the selection lock holes 72 is reduced to three.

Figure 7:
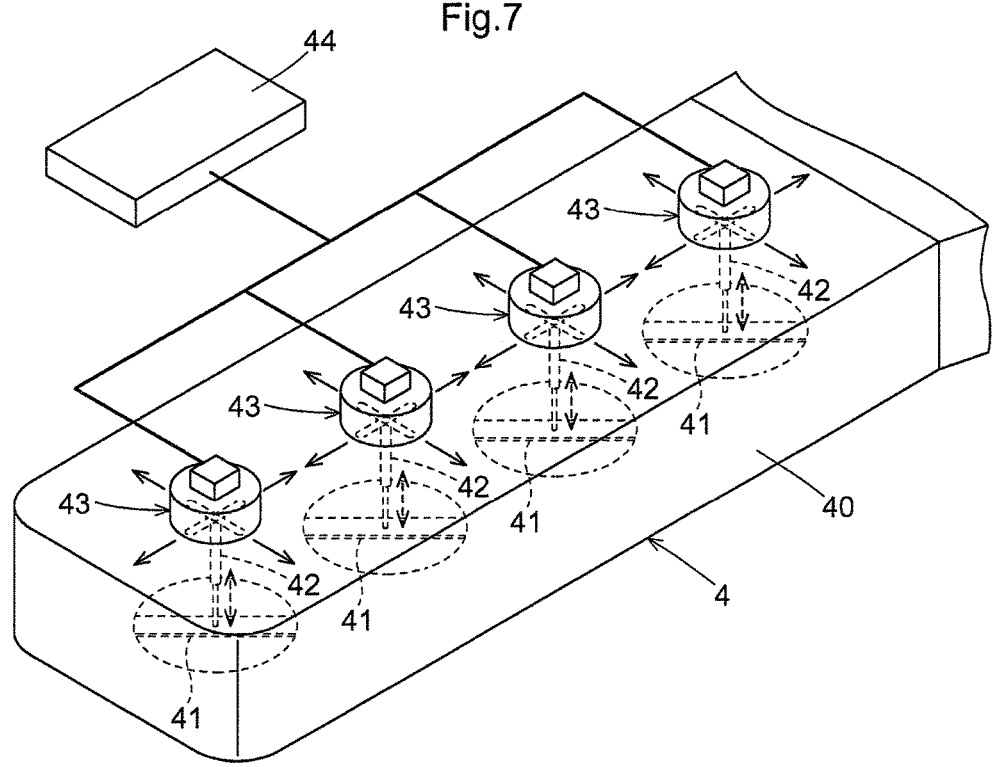
FIG. 7 is a perspective view showing a mower unit.

The mower unit 4 includes a mower deck 40 consisting of a top plate and a side plate. In the space inside the mower deck 40, as shown by dotted lines in FIG. 7, there are provided a plurality (reduced to four in FIG. 7) of mini blades 41 disposed side by side in the vehicle body transverse direction. Each mini blade 41 is fixed to a lower end of a rotational shaft 42 associated therewith. Each rotational shaft 42 receives rotational power from an associated motor unit 43 and is capable of displacement in the axial direction of the rotational shaft 42 (Z displacement), displacement in the vehicle body front-rear direction (Y displacement) and displacement in the vehicle body transverse direction (X displacement). With this, the mini blade 41 can be displaced in three-dimensions (X, Y, Z directions). The motor unit 43 provides a rotation function for rotating the rotational shaft 42 and a displacement function for displacing in the three-dimensions (X, Y and X directions).

Figure 8:
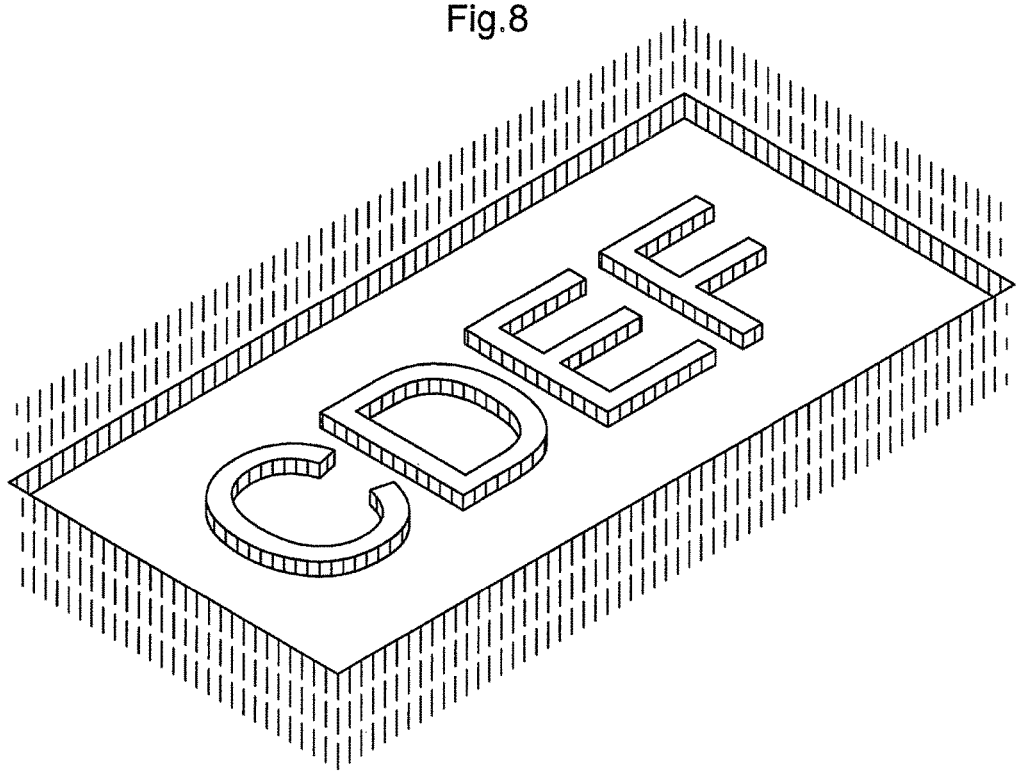
FIG. 8 is perspective views showing an elaborately designed grass-mowed swath pattern.

The rotation function and the displacement function of the motor unit 43 are controlled independently for each mini blade 41 by a blade control section 44. Then, if these rotation and three-dimensional displacement controls of the mini blades 41 by this blade control section 44 are combined with forward/reverse traveling of the vehicle body 1, it is possible to create an elaborately designed grass-mowed swath pattern such as one shown in FIG. 8.

In the foregoing embodiment, the work vehicle is configured as a grass mower. However, the present invention is applicable also to a tractor, a rice planter, etc.

The invention claimed is:

1. A work vehicle comprising:
a vehicle body frame extending in a vehicle body front-rear direction;
a front wheel unit and a rear wheel unit attached to the vehicle body frame;
a driver's seat disposed upwardly of the vehicle body frame;
a power source mounted at a rear portion of the vehicle body frame;
a ROPS bracket fixed to the vehicle body frame and at a region forwardly of the power source; and
a ROPS including:
a pair of left and right upright portions, lower end portions of the pair of upright portions being supported to the ROPS bracket to be pivotable toward the power source about a horizontal axis extending in a vehicle-body transverse direction, and
a crossbar connecting the upright portions at upper portions thereof,
wherein the horizontal axis about which said ROPS bracket is pivotable is located below a bottom of the driver's seat.

2. The work vehicle of claim 1, wherein:
a distance between the upright portions is greater than a width of the power source; and
the upright portions, when pivoted to a horizontal posture, are located lower than the driver's seat and laterally of the power source.

3. The work vehicle of claim 1, wherein the ROPS bracket includes a pivot pin having the horizontal axis and supporting the upright portions, and a lock mechanism for locking the upright portions at a plurality of pivotal positions.

4. The work vehicle of claim 3, wherein the lock mechanism comprises a plurality of lock holes extending parallel with the pivot pin and a lock pin to be inserted into the lock holes.

5. The work vehicle of claim 4, wherein the plurality of lock holes are formed upwardly of the horizontal axis in the ROPS bracket.

6. The work vehicle of claim 4, wherein the plurality of lock holes are formed downwardly of the horizontal axis in the ROPS bracket.

7. The work vehicle of claim 3, wherein the plurality of lock positions include a ROPS position at which the upright portions provide ROPS function, a power-source guard position at which the upright portions and the crossbar assume a horizontal posture to surround the power source, and a towing position at which the upright portions and the crossbar assume a downwardly inclined posture beyond the horizontal posture to allow the ROPS to serve as a tow hitch.

8. A work vehicle comprising:
a vehicle body frame extending in a vehicle body front-rear direction;
a front wheel unit and a rear wheel unit attached to the vehicle body frame;
the rear wheel unit comprising a left rear wheel fender and a right rear wheel fender;
a driver's seat disposed upwardly of the vehicle body frame;
a power source mounted at a rear portion of the vehicle body frame;
a ROPS bracket fixed to the vehicle body frame and at a region forwardly of the power source; and
a ROPS including:
a pair of left and right upright portions, lower end portions of the pair of upright portions being supported to the ROPS bracket to be pivotable toward the power source about a horizontal axis extending in a vehicle-body transverse direction, and
a crossbar connecting the upright portions at upper portions thereof,
wherein the horizontal axis about which said ROPS bracket is pivotable is located below at least one of the left rear wheel fender and the right rear wheel fender, and
a bottom of the driver's seat.

9. The work vehicle of claim 8, wherein:
a distance between the upright portions is greater than a width of the power source; and
the upright portions, when pivoted to a horizontal posture, are located lower than the driver's seat and laterally of the power source.

10. The work vehicle of claim 8, wherein the ROPS bracket includes a pivot pin having the horizontal axis and supporting the upright portions, and a lock mechanism for locking the upright portions at a plurality of pivotal positions.

11. The work vehicle of claim 10, wherein the lock mechanism comprises a plurality of lock holes extending parallel with the pivot pin and a lock pin to be inserted into the lock holes.

12. The work vehicle of claim 11, wherein the plurality of lock holes are formed upwardly of the horizontal axis in the ROPS bracket.

13. The work vehicle of claim 11, wherein the plurality of lock holes are formed downwardly of the horizontal axis in the ROPS bracket.

14. The work vehicle of claim 10, wherein the plurality of lock positions include a ROPS position at which the upright portions provide ROPS function, a power-source guard position at which the upright portions and the crossbar assume a horizontal posture to surround the power source, and a towing position at which the upright portions and the crossbar assume a downwardly inclined posture beyond the horizontal posture to allow the ROPS to serve as a tow hitch.

15. The work vehicle of claim 8, wherein the horizontal axis about which said ROPS bracket is pivotable is located below both of
   the left rear wheel fender and the right rear wheel fender, and
   a bottom of the driver's seat.

* * * * *